(12) United States Patent
Choi et al.

(10) Patent No.: US 9,926,444 B2
(45) Date of Patent: Mar. 27, 2018

(54) THERMOPLASTIC RESIN COMPOSITION, METHOD OF PREPARING THE SAME AND MOLDED PRODUCT USING THE SAME

(71) Applicant: LG CHEM, LTD., Seoul (KR)

(72) Inventors: Jeong Su Choi, Daejeon (KR); Min Cheol Ju, Daejeon (KR); Min Seung Shin, Daejeon (KR); Sung Won Hong, Daejeon (KR); In Soo Kim, Daejeon (KR); Ho Hoon Kim, Daejeon (KR); Sang Hoo Park, Daejeon (KR); Keun Hoon Yoo, Daejeon (KR); Roo Da Lee, Daejeon (KR); Won Seok Lee, Daejeon (KR); Hyung Sub Lee, Daejeon (KR); Seok Goo Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/903,485

(22) PCT Filed: Oct. 15, 2015

(86) PCT No.: PCT/KR2015/010880
§ 371 (c)(1),
(2) Date: Jan. 7, 2016

(87) PCT Pub. No.: WO2016/072632
PCT Pub. Date: May 12, 2016

(65) Prior Publication Data
US 2017/0260384 A1    Sep. 14, 2017

(30) Foreign Application Priority Data

Nov. 7, 2014  (KR) .................. 10-2014-0154225

(51) Int. Cl.
*C08L 51/04* (2006.01)
*C08L 33/12* (2006.01)
*C08L 25/14* (2006.01)

(52) U.S. Cl.
CPC .............. *C08L 33/12* (2013.01); *C08L 25/14* (2013.01); *C08L 51/04* (2013.01)

(58) Field of Classification Search
CPC .............................. C08L 51/04; C08L 51/003
See application file for complete search history.

(56) References Cited

U.S. PATENT DOCUMENTS

| | | | | | |
|---|---|---|---|---|---|
| 4,897,462 | A | * | 1/1990 | Yusa | .......................... C08F 6/22 523/352 |
| 7,019,049 | B1 | * | 3/2006 | Yoo | ........................ C08F 279/02 523/201 |
| 2010/0140829 | A1 | * | 6/2010 | Bernd | .................. B29C 70/025 264/145 |
| 2011/0237749 | A1 | * | 9/2011 | Muller | .................. C08F 285/00 525/84 |
| 2017/0114215 | A1 | * | 4/2017 | Ooaira | ..................... C08L 51/06 |
| 2017/0227701 | A1 | * | 8/2017 | Nishikawa | ............. G02B 6/005 |

FOREIGN PATENT DOCUMENTS

| | | |
|---|---|---|
| CN | 1177876 C | 12/2004 |
| CN | 100506912 C | 7/2009 |
| JP | S60-217224 A | 10/1985 |
| JP | 2004-502817 A | 1/2004 |
| JP | 2005-112907 A | 4/2005 |
| KR | 10-2002-0003484 A | 1/2002 |
| KR | 10-2008-0048495 A | 6/2008 |
| KR | 10-2011-0015062 A | 2/2011 |
| KR | 10-2013-0078741 A | 7/2013 |
| WO | WO 02/02691 A1 | 1/2002 |

OTHER PUBLICATIONS

Office Action from Chinese Patent Office for CN Application No. 201580001460.9, dated May 10, 2017.
International Search Report for PCT/KR2015/010880, filed on Oct. 15, 2015.

* cited by examiner

Primary Examiner — Jeffrey C Mullis

(57) ABSTRACT

Disclosed are a thermoplastic resin composition and a method of preparing the same. More particularly, the present invention relates to a thermoplastic resin composition including 10 to 90% by weight of a graft copolymer resin coagulated by an organic acid or an organic acid salt; and 90 to 10% by weight of a non-graft copolymer resin and having a moist-heat characteristic of 20 or less, wherein a refractive index difference between the graft copolymer resin and the non-graft copolymer resin is less than 0.01, a method of preparing the same, and a molded product comprising the same. According to the present disclosure, provided are a thermoplastic resin composition having superior overall property balance, color, and transparency, and being applicable to products that are exposed to high-temperature water or should be sterilized, due to excellent moist-heat resistance thereof, a method of preparing the same, and a molded product comprising the same.

13 Claims, No Drawings

THERMOPLASTIC RESIN COMPOSITION, METHOD OF PREPARING THE SAME AND MOLDED PRODUCT USING THE SAME

CROSS-REFERENCE TO RELATED APPLICATION(S)

This application is a National Stage of International Patent Application No. PCT/KR2015/010880, filed on Oct. 15, 2015, which claims the benefit of Korean Patent Application No. 10-2014-0154225 filed on 7 Nov. 2014 with the Korean Intellectual Property Office, the disclosures of which are herein incorporated by reference in their entirety.

TECHNICAL FIELD

The present invention relates to a thermoplastic resin composition, a method of preparing the same, and a molded product including the same. More particularly, the present invention relates to a thermoplastic resin composition including 10 to 90% by weight of a graft copolymer resin and 90 to 10% by weight of a non-graft copolymer resin and having a moist-heat characteristic (Δhaze) of 20 or less, wherein a refractive index difference between the graft copolymer resin and the non-graft copolymer resin is less than 0.01, a method of preparing the same, and a molded product including the same.

According to the present disclosure, provided are a thermoplastic resin composition having superior overall property balance, color, and transparency, and being applicable to products that are exposed to high-temperature water or should be sterilized, due to excellent moist-heat resistance thereof, a method of preparing the same, and a molded product comprising the same.

BACKGROUND ART

In accordance with advancement of industry and varied lifestyles, research into applying high-level functions such as transparency to materials is actively underway so as to realize differentiation of products. For example, research into providing transparency to materials as in a cover of a washing machine to see laundry, a dust collector of a vacuum to see how much dust is collected, a housing of a game console, transparent windows of home appliances, transparent windows of office equipment, etc. is very actively underway. However, the existing acrylonitrile-butadiene-styrene (hereinafter referred to as ABS) copolymer resin used in these components has superior impact resistance, chemical resistance, processability and surface gloss, but is opaque due to characteristics thereof, whereby use thereof in materials requiring transparency is limited.

As generally used transparent resins, there are polycarbonate (PC) resin, polymethyl methacrylate (PMMA) resin, polystyrene (PS) resin, polyacrylonitrile-styrene (SAN) resin, etc. Since polycarbonate resin has superior impact strength and transparency, but poor processability, it is difficult to prepare complex products using the same. Polymethylmethacrylate resin has superior optical characteristics, but very poor impact resistance and chemical resistance. In addition, polystyrene (PS) resin and polyacrylonitrile-styrene (SAN) resin also have very poor impact resistance and chemical resistance.

Acrylonitrile-butadiene-styrene based (hereinafter referred to as ABS) terpolymers are opaque resins in which properties such as impact strength and fluidity are well balanced. U.S. Pat. No. 4,767,833, Japanese Patent Laid-Open Publication No. Hei 11-147020, European Patent NO. 703,252, and Japanese Patent Laid-Open Publication No. Hei 8-199008 disclose methods of introducing acrylic acid alkyl ester or methacrylic acid alkyl ester into an acrylonitrile-butadiene-styrene based (ABS) resin having superior impact resistance, chemical resistance, processability, etc. to provide transparency. Since these methods use emulsion polymerization, final products exhibit decreased moist-heat characteristics due to characteristics of emulsion polymerization through which a large amount of residue is generated, thus being deformed under conditions of high temperature and humidity. Accordingly, it is difficult to apply the same to products that come into contact with high-temperature water, such as humidifiers, washing machines, coffee machines, and water purifiers, and children's toy which are sterilized.

Therefore, there is an urgent need for transparent resins which can enhance moist-heat characteristics and have superior color and transparency.

DISCLOSURE

Technical Problem

Therefore, the present invention has been made in view of the above problems, and it is one object of the present invention to provide a thermoplastic resin composition, including 10 to 90% by weight of a graft copolymer resin coagulated by an organic acid or an organic acid salt; and 90 to 10% by weight of a non-graft copolymer resin, and having a moist-heat characteristic (Δhaze) of 20 or less, wherein a refractive index difference between the graft copolymer resin and the non-graft copolymer resin is less than 0.01.

It is another object of the present invention to provide a method of preparing the thermoplastic resin composition.

It is yet another object of the present invention to provide a molded product including the thermoplastic resin composition.

The above and other objects can be accomplished by the present invention described below.

Technical Solution

In accordance with one aspect of the present invention, provided is a thermoplastic resin composition, including 10 to 90% by weight of a graft copolymer resin coagulated by an organic acid or an organic acid salt; and 90 to 10% by weight of a non-graft copolymer resin, and having a moist-heat characteristic (Δhaze) of 20 or less, wherein a refractive index difference between the graft copolymer resin and the non-graft copolymer resin is less than 0.01.

In accordance with another aspect of the present invention, provided is a method of preparing a thermoplastic resin composition, the method including: preparing a graft copolymer resin coagulated by an organic acid or an organic acid salt; and mixing 10 to 90% by weight of the graft copolymer resin and 90 to 10% by weight of a non-graft copolymer, wherein the preparing step comprises emulsion-graft-polymerizing of 20 to 60% by weight of a (meth)acrylic acid alkyl ester compound, 7 to 30% by weight of an aromatic vinyl compound, and 0 to 10% by weight of a vinyl cyan compound with 20 to 70% by weight of a conjugated diene rubber; and, after terminating the emulsion-graft-polymerizing, coagulating the graft copolymer resin by adding the organic acid or the organic acid salt.

In accordance with yet another aspect of the present invention, provided is a molded product prepared from the thermoplastic resin composition.

Advantageous Effects

As is apparent from the fore-going, the present invention advantageously provides a thermoplastic resin composition having superior overall property balance, color, and transparency, and being applicable to products that are exposed to high-temperature water or should be sterilized, due to excellent moist-heat resistance thereof, a method of preparing the same, and a molded product including the same.

BEST MODE

Hereinafter, the present disclosure is described in detail.

A thermoplastic resin composition according to the present disclosure includes 10 to 90% by weight of a graft copolymer resin coagulated by an organic acid or an organic acid salt; and 90 to 10% by weight of a non-graft copolymer resin, and having a moist-heat characteristic (Δhaze) of 20 or less, wherein a refractive index difference between the graft copolymer resin and the non-graft copolymer resin is less than 0.01.

The thermoplastic resin composition may include, for example, 10 to 90% by weight of the graft copolymer resin coagulated by the organic acid or the organic acid salt and 90 to 10% by weight of the non-graft copolymer resin, or 20 to 80% by weight of the graft copolymer resin coagulated by the organic acid or the organic acid salt and 80 to 20% by weight of the non-graft copolymer resin. When the amount of the graft copolymer resin is less than 10% by weight, impact strength is decreased. When the amount of the graft copolymer resin is greater than 90% by weight, moist-heat resistance and transparency are decreased.

In an embodiment, the amount of the organic acid or the organic acid salt may be 0.3 to 5 parts by weight, 0.7 to 4 parts by weight, or 1 to 3 parts by weight, based on 100 parts by weight of a total of a conjugated diene rubber, a (meth) acrylic acid alkyl ester compound, an aromatic vinyl compound, and a vinyl cyan compound. Within these ranges, change of color or transparency in high-temperature water or under a condition of high temperature and high humidity is small.

The organic acid may be one or more selected from the group consisting of, for example, acetic acid, formic acid, citric acid, butyric acid, palmitic acid, and oxalic acid.

The organic acid salt may be one or more selected from the group consisting of, for example, calcium acetate, calcium formate, calcium citrate, calcium butyrate, calcium palmitate, calcium oxalate, magnesium acetate, magnesium formate, magnesium citrate, magnesium butyrate, magnesium palmitate, magnesium oxalate, aluminium acetate, aluminium formate, aluminium citrate, aluminium butyrate, aluminium palmitate, aluminium oxalate, sodium acetate, sodium formate, sodium citrate, sodium butyrate, sodium palmitate, sodium oxalate, potassium acetate, potassium formate, potassium citrate, potassium butyrate, potassium palmitate, potassium oxalate, zinc acetate, zinc formate, zinc citrate, zinc butyrate, zinc palmitate, and zinc oxalate.

Preferably, the thermoplastic resin composition has a moist-heat characteristic (Δhaze) of 20 or less, 15 or less, or 10 or less. Within these ranges, change of color and transparency in high-temperature water or under a condition of high temperature and high humidity is small.

In the thermoplastic resin composition, a refractive index difference between the graft copolymer resin and the non-graft copolymer resin may be less than 0.01, less than 0.007 or less than 0.005. Within these ranges, superior transparency is exhibited.

In the thermoplastic resin composition, a total conjugated diene rubber content may be, for example, 5 to 35% by weight or 7 to 30% by weight. Within these ranges, superior impact strength and processability are exhibited and, since flow marks are not generated on a surface, superior transparency is exhibited.

In the thermoplastic resin composition, a total (meth) acrylic acid alkyl ester compound content may be, for example, 20 to 80% by weight or 30 to 70% by weight. Within these ranges, superior property balance is exhibited.

In the thermoplastic resin composition, a total aromatic vinyl compound content may be, for example, 10 to 40% by weight or 15 to 30% by weight. Within these ranges, superior transparency is exhibited.

In the thermoplastic resin composition, a total vinyl cyan compound content may be, for example, 0 to 10% by weight or 0.1 to 7% by weight. Within these ranges, superior color characteristics and transparency are exhibited.

In the graft copolymer resin, 20 to 60% by weight of the (meth)acrylic acid alkyl ester compound, 7 to 30% by weight of the aromatic vinyl compound, and 0 to 10% by weight of the vinyl cyan compound, with 20 to 70% by weight of the conjugated diene rubber may be included.

In another embodiment, the amount of the conjugated diene rubber may be 30 to 65% by weight or 35 to 59% by weight. Within these ranges, satisfactory grafting occurs, whereby mechanical properties such as impact strength and transparency are superior.

In another embodiment, the amount of the (meth)acrylic acid alkyl ester compound may be 25 to 55% by weight or 30 to 50% by weight. Within these ranges, superior property balance is exhibited.

In another embodiment, the amount of the aromatic vinyl compound may be 7 to 25% by weight or 10 to 20% by weight. Within these ranges, compatibility thereof with the non-graft copolymer is superior.

In another embodiment, the amount of the vinyl cyan compound may be 0 to 7% by weight or 0.1 to 5% by weight. Within these ranges, a coagulum is not generated during grafting and color characteristics are superior. Accordingly, demand of consumers requiring natural color may be satisfied.

The transparency of the graft copolymer resin is determined by the refractive indexes of the conjugated diene rubber and the grafted compounds. So as to provide transparency, a refractive index difference between the conjugated diene rubber and the total of the grafted compounds should be, for example, less than 0.01, less than 0.007, or less than 0.005. In the conjugated diene rubber and the grafted compounds, butadiene has a refractive index of about 1.518, methyl methacrylate has a refractive index of about 1.49, styrene has a refractive index of about 1.59, acrylonitrile has a refractive index of 1.52, acrylic acid has a refractive index of 1.527, and polyethyleneglycol monomethacrylate has a refractive index of about 1.49 to 1.52. The refractive index (RI) of the graft copolymer resin is calculated according to the following Mathematical Equation 1.

$$RI = \Sigma Wti * RIi \qquad \text{[Mathematical Equation 1]}$$

Wti=Weight fraction (%) of each ingredient in copolymer
RIi=Refractive index of polymer of each ingredient in copolymer In an embodiment, the non-graft copolymer resin may include 30 to 80% by weight of the (meth)acrylic acid alkyl ester compound, 15 to 50% by weight of the aromatic vinyl compound, and 0 to 20% by weight of the vinyl cyan compound.

In another embodiment, the amount of the (meth)acrylic acid alkyl ester compound may be 40 to 75% by weight or 50 to 70% by weight. Within these ranges, superior property balance is exhibited.

In another embodiment, the amount of the aromatic vinyl compound is 20 to 45% by weight or 25 to 40% by weight. Within these ranges, superior compatibility thereof with a graft polymer is exhibited.

In another embodiment, the amount of the vinyl cyan compound may be 0 to 15% by weight or 0.1 to 10% by weight. Within these ranges, superior color characteristics are exhibited.

The refractive index of the non-graft copolymer resin can be calculated by Mathematical Equation 1.

In an embodiment, the thermoplastic resin composition may further include a lubricant and an antioxidant.

The thermoplastic resin composition may have a transparency (haze) of, for example, 2.0 or less or 1.5 to 1.8. Within these ranges, superior transparency is exhibited.

In addition, a method of preparing a thermoplastic resin composition according to the present disclosure comprises preparing step of a graft copolymer resin coagulated by an organic acid or an organic acid salt; and mixing step of 10 to 90% by weight of the graft copolymer resin and 90 to 10% by weight of a non-graft copolymer, wherein the preparing step comprises emulsion-graft-polymerizing of 20 to 60% by weight of a (meth)acrylic acid alkyl ester compound, 7 to 30% by weight of an aromatic vinyl compound, and 0 to 10% by weight of a vinyl cyan compound with 20 to 70% by weight of a conjugated diene rubber; and, after terminating the emulsion-graft-polymerizing, coagulating step of the graft copolymer resin by adding the organic acid or the organic acid salt.

In an embodiment, the graft copolymer resin may be prepared through emulsion polymerization. Here, each ingredient may be added batchwise, or the total or some of ingredients may be continuously, gradationally, or sequentially added.

An emulsifier used in emulsion polymerization of the graft copolymer may be one or more selected from the group consisting of, for example, alkylaryl sulfonate, alkali methyl alkyl sulfate, sulfonated alkyl ester salt, alkyl(alkenyl)carboxylate, and alkyl(alkenyl) succinate.

The graft copolymer may be prepared into a powder by dehydrating and drying after performing polymerization and then coagulation with a coagulant.

Examples of the coagulation method include, without being limited to, includes a batch-type coagulate method of adding latex after addition of a coagulant, etc., a continuous coagulation method of continuously adding a coagulant and latex, a method of coagulating by adding mechanical shear (mechanical coagulation), slow coagulation, etc.

After the coagulation, the pH of the graft polymer may be elevated using a neutralizing agent. As the neutralizing agent, sodium hydroxide, potassium hydroxide, or a mixture thereof may be used.

In an embodiment, the non-graft copolymer resin may include 30 to 80% by weight of the (meth)acrylic acid alkyl ester compound, 15 to 50% by weight of the aromatic vinyl compound, and 0 to 20% by weight of the vinyl cyan compound, and a method of preparing the non-graft copolymer resin may comprise step of solution polymerization or bulk polymerization.

A refractive index difference between the non-graft copolymer resin and the graft copolymer resin is, for example, less than 0.01, less than 0.007, or less than 0.005. Within these ranges, superior transparency is exhibited.

The conjugated diene rubber is a polymer of a conjugated compound in which a double bond and a single bond are alternately arranged. The conjugated diene rubber may be one or more selected form the group consisting of, for example, a butadiene polymer, a butadiene-styrene copolymer (SBR), a butadiene-acrylonitrile copolymer (NBR), an ethylene-propylene copolymer (EPDM), and polymers derived therefrom. Preferably, the conjugated diene rubber is a butadiene copolymer, a butadiene-styrene copolymer, or a mixture thereof.

In an embodiment, the conjugated diene rubber may have a particle diameter of 800 to 4,000 Å, a gel content of 60 to 95%, and a swelling index of 12 to 40.

In another embodiment, the conjugated diene rubber may have a particle diameter of 1,500 to 3,500 Å, a gel content of 70 to 90%, and a swelling index of 20 to 30. Within these ranges, superior impact strength and processability are exhibited.

The (meth)acrylic acid alkyl ester compound may be, for example, a methacrylic acid alkyl ester compound, an acrylic acid alkyl ester compound, or a mixture thereof.

In another embodiment, the (meth)acrylic acid alkyl ester compound may be one or more selected from the group consisting of (meth)acrylic acid methyl ester, (meth)acrylic acid ethyl ester, (meth)acrylic acid propyl ester, (meth)acrylic acid 2-ethyl hexyl ester, (meth)acrylic acid decyl ester and (meth)acrylic acid lauryl ester. Preferably, the (meth)acrylic acid alkyl ester compound is methyl methacrylate.

The aromatic vinyl compound may be one or more selected from the group consisting of, for example, styrene, α-methylstyrene, o-ethylstyrene, p-ethylstyrene, and vinyl toluene. Preferably, the aromatic vinyl compound is styrene.

The vinyl cyan compound may be one or more selected from the group consisting of, for example, acrylonitrile, methacrylonitrile and ethacrylonitrile.

In addition, a thermoplastic resin composition is prepared according to the method of preparing the thermoplastic resin composition of the present disclosure.

Further, a molded product is manufactured from the thermoplastic resin composition of the present disclosure.

The molded product may be, for example, a humidifier component, a washing machine component, a coffee machine component, a water purifier component, or a toy.

Now, the present invention will be described in more detail with reference to the following examples. These examples are provided only for illustration of the present invention and should not be construed as limiting the scope and spirit of the present invention.

EXAMPLES

Graft Copolymer Preparation Example A-1

So as to prepare a graft copolymer, 100 parts by weight of ion exchanged water, 1.0 part by weight of an oleic acid sodium emulsifier, 35% by weight of methyl methacrylate, 12% by weight of styrene, 3% by weight of acrylonitrile, 0.5 part by weight of tertiary dodecyl mercaptan, 0.05 part by weight of ethylene diamine tetraacetic acid, 0.1 part by weight of sodium formaldehyde sulfoxylate, 0.001 part by weight of ferrous sulfate, and 0.2 part by weight of tert-butyl hydroperoxide were continuously added to and reacted with 50% by weight (based on solid) of rubber latex which was prepared through emulsion polymerization and had a gel content of 70% and an average particle diameter of 0.3 μm at 75° C. over five hours. After the reaction, temperature was elevated to 80° C. and then aging was carried out for one hour. After terminating the reaction, coagulation was carried out using 3 parts by weight of acetic acid as a coagulant, followed by dehydrating and drying. As a result, a powder-type graft copolymer was obtained. The refractive index of the obtained graft copolymer was 1.516 (the amounts of conjugated diene rubber, (meth)acrylic acid alkyl ester compound, aromatic vinyl compound, and vinyl cyan compound were represented by % by weight, and addition amounts of other materials are represented based on 100 parts by weight of the total of the conjugated diene rubber, the (meth)acrylic acid alkyl ester compound, the aromatic vinyl compound, and the vinyl cyan compound).

Graft Copolymer Preparation Example A-2

A powder of a graft copolymer was obtained by performing polymerization in the same manner as in Preparation Example A-1, except that 1.0 part by weight of formic acid and 1.0 part by weight of formic acid sodium were used as coagulants. The refractive index of the graft copolymer was 1.516.

Graft Copolymer Preparation Example A-3

A powder of a graft copolymer was obtained by performing polymerization in the same manner as in Preparation Example A-1, except that 27.8% by weight of methyl methacrylate and 19.2% by weight of styrene were used. The refractive index of the graft copolymer was 1.53.

Graft Copolymer Preparation Example A-4

A powder of a graft copolymer was obtained by performing polymerization in the same manner as in Preparation Example A-1, except that 2 parts by weight of sulfuric acid was used as a coagulant. The refractive index of the graft copolymer was 1.516.

Graft Copolymer Preparation Example A-5

A powder of a graft copolymer was obtained by performing polymerization in the same manner as in Preparation Example A-1, except that 2 parts by weight of calcium chloride was used as a coagulant. The refractive index of the graft copolymer was 1.516.

Non-graft Copolymer Preparation Example B-1

70.4% by weight of methyl methacrylate, 24.6% by weight of styrene, 5% by weight of acrylonitrile were mixed with 30 parts by weight of toluene as a solvent and 0.15 part by weight of di-t-dodecyl mercaptan as a molecular weight controller. A resultant mixture was continuously fed into a reactor such that an average reaction time became three hours and reaction temperature was maintained at 148° C. A polymerized solution released from the reactor was heated in a pre-heating tank. In a vaporizing tank, unreacted monomers were vaporized. While maintaining 210° C., a copolymer resin was processed into a pellet type by means of an extruder equipped with a polymer transfer pump. The refractive index of a prepared non-graft copolymer resin was 1.516 (the amounts of (meth)acrylic acid alkyl ester compound, aromatic vinyl compound, and vinyl cyan compound are represented by % by weight, and addition amounts of other materials are represented based on 100 parts by weight of the total of the (meth)acrylic acid alkyl ester compound, the aromatic vinyl compound, and the vinyl cyan compound.

Non-graft Copolymer Preparation Example B-2

A non-graft polymer was prepared in the same manner as in Preparation Example B-1, except that 45% by weight of methylmethacrylate, 50% by weight of styrene, and 5% by weight of acrylonitrile were used. The refractive index of the prepared non-graft polymer was 1.542.

Examples 1 to 2 and Comparative Examples 1 to 4

Graft copolymers (A) prepared according to Preparation Examples A-1 to A-5 and non-graft copolymers (B) prepared according to Preparation Examples B-1 and B-2 were mixed as summarized in Table 1 below. 0.3 part by weight of a lubricant and 0.2 part by weight of an antioxidant were added to each of resultant mixtures and fed into a 220° C. cylinder, followed by being prepared into a pellet type by means of a biaxial extrusion kneader. The prepared pellet was injection-molded to prepare a specimen.

[Test Example]

Characteristics of a specimen prepared according to each of Examples 1 and 2 and Comparative Examples 1 to 4 were measured according to the following methods. Results are summarized in Table 2 below.

Average particle diameter: Measured by means of Nicomp 370HPL (manufactured by Nicomp, US) using dynamic laser light scattering.

Gel content and swelling index: Rubber latex was coagulated using a dilute acid or a metal salt and then washed. The washed rubber latex was dried in a 60° C. vacuum oven for 24 hours and then an obtained rubber mass was cut by means of scissors. Subsequently, 1 g of a rubber fragment was fed into 100 g of toluene and, in this state, stored in a dark room at room-temperature for 48 hours. Subsequently, the rubber fragment was separated into a sol and a gel. A gel content and a swelling index were measured according to Mathematical Equations 2 and 3 below.

Gel content (%)=[The weight of insoluble substance (gel)/the weight of sample]×100  [Mathematical Equation 2]

Swelling index=Weight of swelled gel/weight of gel  [Mathematical Equation 3]

Refractive index measurement: Copolymer was thinly spread in a thickness of about 0.2 mm and then the refractive index thereof was measured by means of an Abbe refractometer at 25° C.

Transparency (haze value): Measured according to ASTM1003.

Color (b value): b value (yellowness) was measured by means of Color Quest II manufactured by Hunter Lab.

Moist-heat characteristics (transparency after moist-heating; ΔHaze): A specimen was stored in an oven under a condition of 70° C. and a humidity of 90% for one week. Subsequently, transparency (haze value) was measured. A difference between transparency before moist-heating and transparency after moist-heating was calculated as Δ Haze.

ΔHaze=Haze(after storing under conditions of 70° C. and humidity of 90% for one week)−Haze(before moist-heating)

TABLE 1

| Classification | Graft copolymers (A) | | | | | Non-graft resins (B) | |
|---|---|---|---|---|---|---|---|
| | A-1 | A-2 | A-3 | A-4 | A-5 | B-1 | B-2 |
| Refractive index | 1.516 | 1.516 | 1.53 | 1.516 | 1.516 | 1.516 | 1.542 |
| Example 1 | 30 | | | | | 70 | |
| Example 2 | | 25 | | | | 75 | |
| Comparative Example 1 | | | 30 | | | 70 | |
| Comparative Example 2 | | | | 30 | | 70 | |
| Comparative Example 3 | | | | | 30 | 70 | |
| Comparative Example 4 | 30 | | | | | | 70 |

TABLE 2

| | Transparency (Haze) | B values | Moist-heat characteristics (ΔHaze) |
|---|---|---|---|
| Example 1 | 1.8 | 0.7 | 8.5 |
| Example 2 | 1.7 | 0.8 | 5.6 |
| Comparative Example 1 | 48.2 | 0.4 | 5.1 |
| Comparative Example 2 | 1.8 | 2.8 | 35.4 |
| Comparative Example 3 | 4.5 | 0.5 | 42.5 |
| Comparative Example 4 | >50 | 0.6 | — |

As shown in Table 2, Examples 1 and 2 according to the present disclosure exhibit superior moist-heat characteristics, color, and transparency. On the other hand, in the graft copolymers and the non-graft copolymers according to Comparative Examples 1 and 4, refractive index differences are respectively 0.014 and 0.026, which means that transparency is decreased. In Comparative Example 2 in which sulfuric acid is used as a coagulant of the graft polymer, moist-heat characteristics and color are poor. In addition, in the case of Comparative Example 3 in which calcium chloride is used as a coagulant of a graft polymer, transparency and moist-heat characteristics are deteriorated.

What is claimed is:

1. A thermoplastic resin composition, comprising 10 to 90% by weight of a graft copolymer resin coagulated by an organic acid or an organic acid salt; and 90 to 10% by weight of a non-graft copolymer resin, wherein a refractive index difference between the graft copolymer resin and the non-graft copolymer resin is less than 0.01,
wherein, in the thermoplastic resin composition, a total amount of a conjugated diene rubber is 5 to 35% by weight, a total amount of a (meth)acrylic acid alkyl ester compound is 20 to 80% by weight, a total amount of an aromatic vinyl compound is 10 to 40% by weight, and a total amount of a vinyl cyan compound is 0 to 10% by weight, and
wherein, when the resin composition is exposed to 90% humidity at 70° C. for one week, a change in a haze value (Δhaze) according to ASTM D1003 is 20% or less.

2. The thermoplastic resin composition according to claim 1, wherein the graft copolymer resin is a copolymer resin by graft-polymerizing of 20 to 60% by weight of a (meth)acrylic acid alkyl ester compound, 7 to 30% by weight of an aromatic vinyl compound, and 0 to 10% by weight of a vinyl cyan compound with 20 to 70% by weight of a conjugated diene rubber.

3. The thermoplastic resin composition according to claim 1, wherein the non-graft copolymer resin is a copolymer resin by polymerizing 30 to 80% by weight of a (meth)acrylic acid alkyl ester compound, 15 to 50% by weight of the aromatic vinyl compound, and 0 to 20% by weight of a vinyl cyan compound.

4. The thermoplastic resin composition according to claim 2, wherein, a refractive index difference between the conjugated diene rubber and the copolymer grafted with the conjugated diene rubber is less than 0.01.

5. The thermoplastic resin composition according to claim 1, wherein the (meth)acrylic acid alkyl ester compound is methacrylic acid alkyl ester compound, acrylic acid alkyl ester compound, or a mixture thereof.

6. The thermoplastic resin composition according to claim 1, wherein the aromatic vinyl compound is one or more selected from the group consisting of styrene, α-methylstyrene, o-ethylstyrene, p-ethylstyrene, and vinyl toluene.

7. The thermoplastic resin composition according to claim 1, wherein the vinyl cyan compound is one or more selected from the group consisting of acrylonitrile, methacrylonitrile, and ethacrylonitrile.

8. The thermoplastic resin composition according to claim 1, wherein the amount of the organic acid or the organic acid salt is 0.3 to 5 parts by weight based on 100 parts by weight of a total of a conjugated diene rubber, a (meth)acrylic acid alkyl ester compound, an aromatic vinyl compound, and a vinyl cyan compound.

9. The thermoplastic resin composition according to claim 1, wherein the organic acid is one or more selected from the group consisting of acetic acid, formic acid, citric acid, butyric acid, palmitic acid, and oxalic acid.

10. The thermoplastic resin composition according to claim 1, wherein the organic acid salt is one or more selected from the group consisting of calcium acetate, calcium formate, calcium citrate, calcium butyrate, calcium palmitate, calcium oxalate, magnesium acetate, magnesium formate, magnesium citrate, magnesium butyrate, magnesium palmitate, magnesium oxalate, aluminium acetate, aluminium formate, aluminium citrate, aluminium butyrate, aluminium palmitate, aluminium oxalate, sodium acetate, sodium formate, sodium citrate, sodium butyrate, sodium palmitate, sodium oxalate, potassium acetate, potassium formate, potassium citrate, potassium butyrate, potassium palmitate, potassium oxalate, zinc acetate, zinc formate, zinc citrate, zinc butyrate, zinc palmitate, and zinc oxalate.

11. The thermoplastic resin composition according to claim 1, wherein the thermoplastic resin composition further comprises a lubricant and an antioxidant.

12. A molded product manufactured from the thermoplastic resin composition according to claim 1.

13. The molded product according to claim 12, wherein the molded product is a humidifier component, a washing machine component, a coffee machine component, a water purifier component, or a toy.

* * * * *